United States Patent
Kosco et al.

(10) Patent No.: US 8,286,745 B2
(45) Date of Patent: Oct. 16, 2012

(54) PERSONAL MOBILITY VEHICLE SEAT SUSPENSION

(75) Inventors: James Michael Kosco, West Wyoming, PA (US); Charles J. Martis, Harding, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 139 days.

(21) Appl. No.: 12/749,611

(22) Filed: Mar. 30, 2010

(65) Prior Publication Data

US 2011/0240390 A1 Oct. 6, 2011

(51) Int. Cl.
*B62D 61/06* (2006.01)

(52) U.S. Cl. .......................................... 180/210

(58) Field of Classification Search ............. 180/210, 180/211, 214; 188/322.19, 322.22; 267/136
See application file for complete search history.

(56) References Cited

U.S. PATENT DOCUMENTS

| | | | |
|---|---|---|---|
| 1,120,379 A | 12/1914 | Epley | |
| 4,182,508 A | 1/1980 | Kallai et al. | |
| 4,824,130 A | 4/1989 | Chiu | |
| 5,044,648 A | 9/1991 | Knapp | |
| 5,062,617 A | 11/1991 | Campbell | |
| 5,094,424 A * | 3/1992 | Hartway | 248/600 |
| 5,324,058 A | 6/1994 | Massaro | |
| 5,387,025 A | 2/1995 | Denisar | |
| 5,445,233 A | 8/1995 | Fernie et al. | |
| 5,857,691 A | 1/1999 | Fan | |
| 5,881,988 A | 3/1999 | Liu | |
| 6,050,593 A | 4/2000 | McConnell et al. | |
| 6,056,077 A | 5/2000 | Kobayashi | |
| 6,349,957 B2 | 2/2002 | Smith | |
| 6,581,919 B2 * | 6/2003 | Barefoot et al. | 267/132 |
| 6,631,947 B2 | 10/2003 | Faltings | |
| 6,663,076 B1 * | 12/2003 | Tsai | 248/575 |
| 7,422,224 B2 | 9/2008 | Sicz et al. | |
| 2006/0016648 A1 | 1/2006 | Lin | |
| 2006/0016651 A1 | 1/2006 | Lin | |

* cited by examiner

*Primary Examiner* — Faye M. Fleming
(74) *Attorney, Agent, or Firm* — Woodcock Washburn LLP

(57) ABSTRACT

A powered personal mobility vehicle for transporting an infirm occupant includes at least three wheels configured to contact the ground, at least one electric motor, a frame, a lower seat post coupled to the frame and extending upwardly from the frame, a modular suspension unit supported by the lower seat post, and a seat assembly supported only by the modular suspension unit. The modular suspension unit includes a post assembly that includes an outer post slidably coupled to an inner post, and a dampener located completely within the post assembly. The modular suspension unit is removably coupled to the lower seat post and is configured to be removable from the lower seat post as a unitary assembly. The outer post, the inner post, and the dampener are configured to dampen vertical movement of the seat assembly relative to the frame in response to impact between the wheels and the ground.

28 Claims, 4 Drawing Sheets

PERSONAL MOBILITY VEHICLE SEAT SUSPENSION

TECHNICAL FIELD

The present invention generally relates to personal mobility vehicles such as wheelchairs and scooters. More particularly, the present invention relates to a seat suspension system for personal mobility vehicles.

BACKGROUND

Conventional powered personal mobility vehicles such as powered wheelchairs and scooters help people having reduced mobility to lead a more active lifestyle. The vast majority of conventional powered wheelchairs and scooters have pneumatic tires, which absorb some bumps or shocks via the compressibility of the tires, and thereby somewhat smooth the ride of the vehicle.

Newer, solid core tires for powered wheelchairs and scooters are much stiffer than conventional pneumatic tires, so they have diminished capacity to smooth the ride for a user. Further, many existing powered personal mobility vehicles regardless of the type of wheels were produced to minimize cost and entirely lack a suspension.

SUMMARY

A powered personal mobility vehicle for transporting an infirm occupant, a modular suspension unit for a powered personal mobility vehicle, and a method of retrofitting a powered personal mobility vehicle with a suspension are disclosed.

A powered personal mobility vehicle for transporting an infirm occupant includes at least three wheels configured to contact the ground while the vehicle is operating, at least one electric motor for powering at least one of the wheels in response to input from an occupant, a frame to which the wheels and motor are coupled, a lower seat post coupled to the frame and extending upwardly from the frame, a modular suspension unit supported by the lower seat post, and a seat supported only by the modular suspension unit. The modular suspension unit includes a post assembly that includes an outer post slidably coupled to an inner post, and a dampener located completely within the post assembly. The modular suspension unit is removably coupled to the lower seat post and is configured to be removable from the lower seat post as a unitary assembly. The outer post, the inner post, and the dampener are configured to dampen vertical movement of the seat assembly relative to the frame in response to impact between the wheels and the ground.

The modular suspension unit may include a pre-loading mechanism adapted to reduce the height of the dampener while the modular suspension unit is in an uncompressed position. The pre-loading mechanism may include a threaded bolt and a tapped lower stopper. The lower seat post may be welded to the frame. The powered personal mobility vehicle may include a retainer for preventing removal of the modular suspension unit from the lower seat post until actuation of the retainer, the retainer consisting essentially of a pin that extends through apertures in the lower seat post and the modular suspension unit. The lower seat post may include a vertically oriented tube and the outer post and the inner post of the modular suspension unit may include vertically oriented tubes. The modular suspension unit may be capable of longitudinally slideable engagement with the lower seat post. The powered personal mobility vehicle may include solid core tires coupled to each of the wheels. The modular suspension unit may include a clover seat interface that couples the post assembly to the seat assembly.

A modular suspension unit for a powered personal mobility vehicle includes a post assembly that includes an outer post slidably coupled to an inner post, the post assembly configured to be supported by a lower seat post of the vehicle, and a dampener located completely within the post assembly. The modular suspension unit is configured to be removably coupled to the lower seat post and is configured to be removable from the lower seat post as a unitary assembly. The outer post, the inner post, and the dampener are configured to dampen vertical movement of a seat assembly of the vehicle relative to a frame of the vehicle in response to impact forces acting on the frame.

The modular suspension unit may include a pre-loading mechanism adapted to reduce the height of the dampener while the modular suspension unit is in an uncompressed position. The pre-loading mechanism may include a threaded bolt and a tapped lower stopper. The modular suspension unit may include a retainer configured to prevent removal of the post assembly from the lower seat post until actuation of the retainer, the retainer consisting essentially of a pin that extends through apertures in the lower seat post and the post assembly. The outer post and the inner post of the post assembly may include vertically oriented tubes. The modular suspension unit may be capable of longitudinally slideable engagement with the lower seat post.

A method of retrofitting a powered personal mobility vehicle with a suspension includes the steps of detaching a seat assembly from a lower seat post coupled to a frame of the vehicle, removing an existing upper seat post from the seat assembly, providing a retrofit modular suspension unit as a unitary assembly comprising a post assembly that includes an outer post slidably coupled to an inner post and a dampener located completely within the post assembly, and replacing the existing upper seat post with the retrofit modular suspension unit.

The method may include the step of adjusting pre-loading of the retrofit modular suspension unit according to the weight or desired dampening of the occupant. The step of adjusting pre-loading of the retrofit modular suspension unit may include rotating a pre-load bolt to compress the dampener. The method may include the step of longitudinally sliding the retrofit modular suspension unit into engagement with the lower seat post. The method may include the step of inserting a retainer to prevent removal of the retrofit modular suspension unit from the lower seat post until actuation of the retainer, the retainer consisting essentially of a pin that extends through apertures in the lower seat post and the retrofit modular suspension unit.

These and various other advantages and features are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there are illustrated and described preferred embodiments of the invention.

DETAILED DESCRIPTION OF ILLUSTRATIVE EMBODIMENTS

Figure 1:
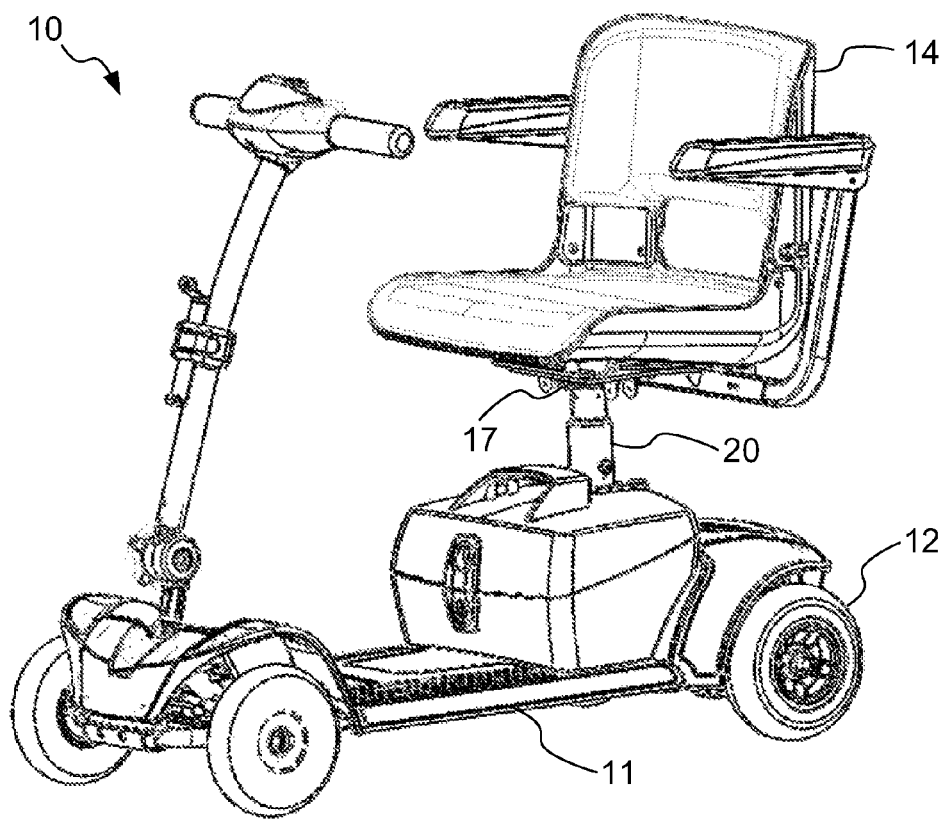
FIG. 1 is a perspective view of a scooter including a suspension system according to an embodiment of the present invention.
Figure 2:
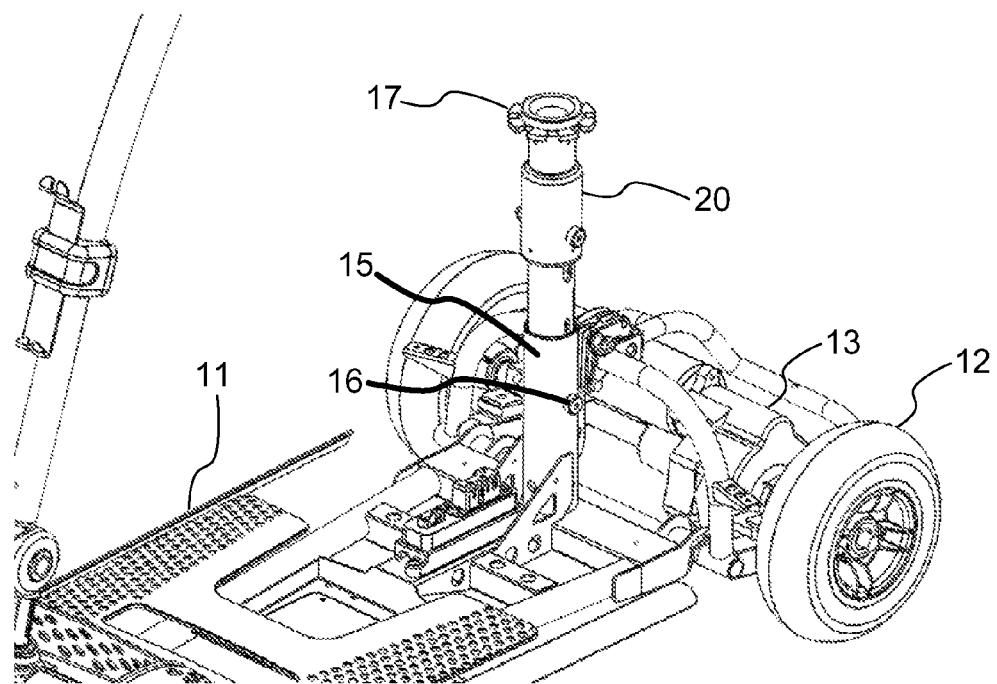
FIG. 2 is a perspective view of a portion of the scooter depicted in FIG. 1A, shown with the seat and plastic shrouds removed.

Referring to FIGS. 1 and 2, a powered scooter 10 for transporting an infirm occupant includes a frame 11, four wheels 12 coupled to frame 11 and configured to contact the ground while scooter 10 is operating, an electric motor 13 for powering wheels 12 in response to input from an occupant, and a seat assembly 14 for supporting an occupant.

Seat assembly 14 is supported on frame 11 via modular suspension unit 20. In particular frame 11 may include suspension support structure, such as a lower seat post 15, that may support both the suspension unit 20 and the seat assembly 14. Lower seat post 15 may be coupled to frame 11 by any mechanism, including for example, welding or bolting. In a typical powered personal mobility vehicle, the lower seat post is welded to the frame. Lower seat post 15 preferably defines a vertically oriented tube shape. It should be understood that the suspension support structure is not limited to a lower seat post, and that other structures are envisioned, including a system whereby sleeves or clamps support the modular suspension unit at two spaced apart locations.

Modular suspension unit 20 provides dampening of the forces acting on wheels 12 while scooter 10 is operating. For example, when scooter 10 rolls over a recess in the ground surface, such as a wide gap between two concrete sidewalk tiles, modular suspension unit 20 dissipates some of the energy that is received into scooter 10 when wheels 12 contact the edge of a sidewalk tile, thereby at least partially insulating an occupant from the wheel movement upon encountering the recess and generally at least partially insulating the occupant from the discomfort of a stiff, bumpy ride.

Modular suspension unit 20 engages and extends downwardly from seat assembly 14, and engages and extends upwardly from lower seat post 15, which is coupled to frame 11 and extends upwardly from frame 11. Modular suspension unit 20 is capable of longitudinally slideable engagement with lower seat post 15. When modular suspension unit 20 is engaged with lower seat post 15, modular suspension unit 20 is coupled to lower seat post 15 by a pin 16 that extends through apertures in modular suspension unit 20 (shown in FIGS. 3A-5B) and lower seat post 15, such that modular suspension unit 20 is supported by lower seat post 15. The seat assembly 14 is configured such that substantially all of the vertical load of the seat assembly 14 is supported by the modular suspension unit 20. Preferably, all of the vertical load of the seat assembly 14 is supported by the modular suspension unit 20.

As shown in FIG. 2, modular suspension unit 20 is a unitary assembly that preferably is inserted at least partially into lower seat post 15 and resides operatively between seat assembly 14 and lower seat post 15. Modular suspension unit 20 and lower seat post 15 are coupled together such that when modular suspension unit 20 is uncoupled from and removed from lower seat post 15, modular suspension unit 20 is removed as a unitary assembly. Although modular suspension unit 20 is shown as being coupled to lower seat post 15 by pin 16, any retainer may be used for preventing removal of modular suspension unit 20 from lower seat post 15.

Because the modular suspension unit 20 is a unitary assembly, a pre-existing scooter (that is, a scooter that was previously made without a suspension incorporated into the seat/seat post) may be easily modified to include the modular suspension unit 20. For example, to retrofit a pre-existing scooter, the upper seat post may be removed and replaced with the modular suspension unit 20 and the modular suspension unit 20 may then be coupled to a pre-existing portion of the frame 11, such as to the lower seat post 15.

In the preferred embodiment, seat assembly 14 preferably is supported only by modular suspension unit 20. In this regard, modular suspension unit 20 may be located between seat assembly 14 and lower seat post 15, or alternatively, modular suspension unit 20 may be located within overlapping, upper and lower coaxial tubes (not shown in the figures). In the preferred embodiment, a conventional clover seat interface 17 is attached to modular suspension unit 20 for coupling modular suspension unit 20 to seat assembly 14. Alternatively, clover seat interface 17 may be included in seat assembly 14 or modular suspension unit 20, or clover seat interface 17 may be attached to an upper seat post (not shown) that is located between seat assembly 14 and modular suspension unit 20.

Although the powered personal mobility vehicle is shown in the Figures as powered scooter 10, the powered personal mobility vehicle may also be a powered wheelchair, or any other powered personal mobility vehicle that has a need for incorporating a suspension to the seat/seat post. Wheels 12 may be any type of wheels, but in a preferred embodiment, wheels 12 include solid core tires. Although four wheels 12 are shown in FIG. 1, the powered personal mobility vehicle may include any number of wheels 12 coupled to frame 11, including for example, three wheels, five wheels, six wheels, or eight wheels. Although a single electric motor 13 is shown in FIG. 2 coupled to frame 11 and wheels 12, the powered personal mobility vehicle may include any number of electric motors 13, including for example, two motors, three motors, or four motors.

Figure 3A:
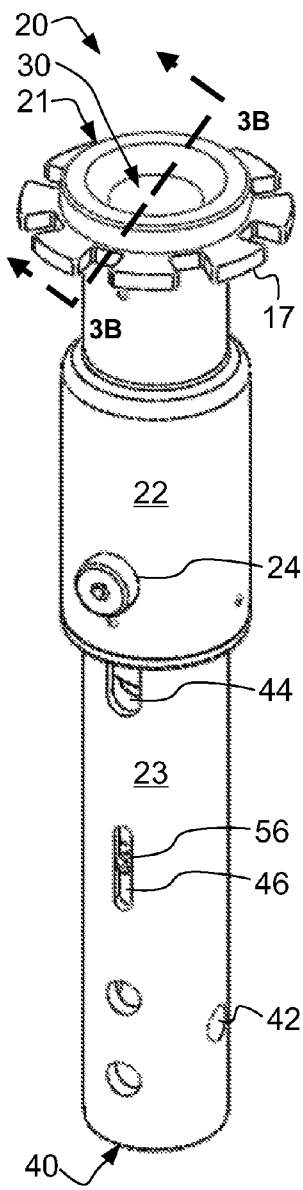
FIG. 3A is a perspective view of the modular suspension unit depicted in FIG. 1A, shown with the modular suspension unit in an uncompressed position.
Figure 3B:
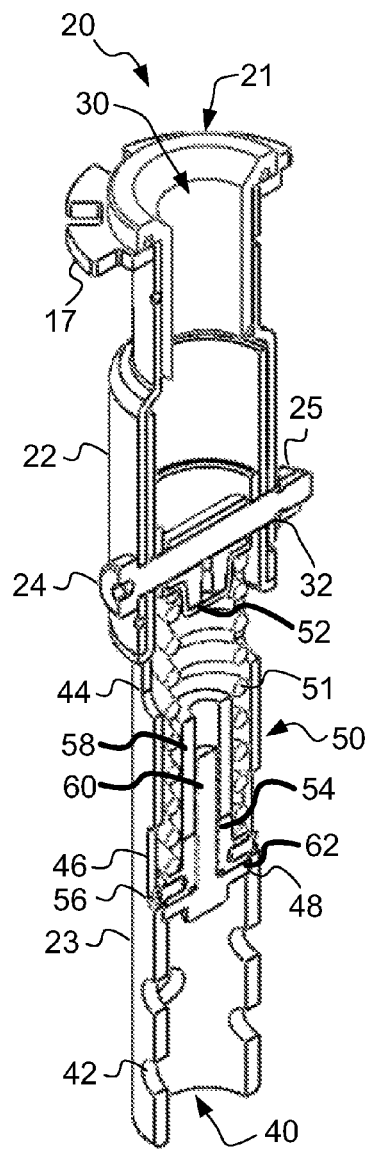
FIG. 3B is a cross-sectional perspective view of the modular suspension unit depicted in FIG. 3A, taken along the line 3B-3B.
Figure 3C:
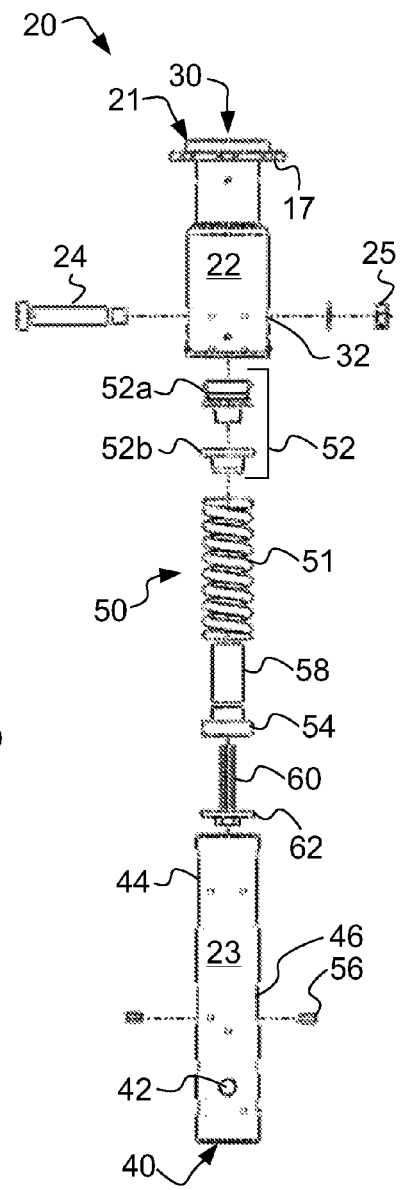
FIG. 3C is an exploded side view of the modular suspension unit depicted in FIG. 3A.

Referring now to FIGS. 3A-3C, a modular suspension unit 20 includes a post assembly 21, a dampener 50, and a pre-load bolt 60. Post assembly 21 includes an outer post 22, an inner post 23, and a coupling bolt 24 and a nut 25 for slidably coupling together outer post 22 and inner post 23. Outer post 22, inner post 23, and dampener 50 are configured to dampen vertical movement of seat assembly 14 relative to frame 11 in response to impact between wheels 12 and the ground.

Outer post 22 preferably defines a vertically oriented tube shape. Outer post 22 defines a cavity 30 and apertures 32 that are adapted to receive coupling bolt 24. Outer post 22 is coupled to seat assembly 14 by clover seat interface 17.

Inner post 23 preferably defines a vertically oriented tube. Inner post 23 defines a cavity 40, apertures 42 that are adapted to receive pin 16 for coupling of inner post 23 to lower seat post 15, slots 44 that are adapted for slideable engagement with coupling bolt 24, slots 46 that are adapted for slideable engagement with anti-rotation pins 56, and a shoulder 48 that is adapted to constrain the vertical position of pre-load bolt 60 relative to inner post 23.

As shown in the Figures, inner post 23 defines three pairs of apertures 42. Each pair of apertures 42 is located at a different height along inner post 23, allowing inner post 23 to be coupled to lower seat post 15 at three different heights, thereby providing a mechanism to adjust the height of seat assembly 14 relative to frame 11. Although inner post 23 is shown as having three pairs of apertures 42, inner post 23 may define any number of pairs of apertures 42, depending on the desired gradation of height variation of seat assembly 14 relative to frame 11.

Dampener 50 is positioned inside cavities 30 and 40 and includes a spring 51, an upper stopper 52 for constraining the location of the top of spring 51 relative to outer post 22, a lower stopper 54 for constraining the location of the bottom of spring 51 relative to inner post 23, anti-rotation pins 56 for preventing the rotation of lower stopper 54 during pre-loading, and a bumper 58 for defining the minimum compressed height of spring 51. Spring 51 preferably is located completely within post assembly 21. It should be understood that dampener 50 may be a gas strut, elastomer, leaf spring, or any other device capable of dampening vibrations.

Upper stopper 52 includes a stopper core 52a and a stopper cover 52b that fits over the bottom of stopper core 52a. Preferably, stopper core 52a is made from a relatively rigid material such as steel, and stopper cover 52b is made from a more flexible material such as Delrin (i.e. polyoxymethylene plastic). Coupling bolt 24 passes through an aperture defined by stopper core 52a to couple upper stopper 52 to outer post 22.

Anti-rotation pins 56 may be coupled to lower stopper 54 by any mechanism, including for example, anti-rotation pins 56 being threaded screws that are mated with tapped apertures in lower stopper 54, anti-rotation pins 56 being un-threaded pins that are press-fit into apertures in lower stopper 54, anti-rotation pins 56 being un-threaded pins that are welded into apertures in lower stopper 54, or ant-rotation pins 56 and lower stopper 54 being a single unitary component or casting.

Pre-load bolt 60 includes a head 62 that is adapted to fit into shoulder 48, such that the vertical position of pre-load bolt 60 is constrained relative to inner post 23. Preferably, pre-load bolt 60 and head 62 are made from a bolt welded to a washer. However, pre-load bolt 60 and head 62 may be constructed as a unitary piece, such as a casting. Pre-load bolt 60 preferably is adapted to be vertically moveable relative to lower stopper 54, for example, by pre-load bolt 60 being threaded and lower stopper 54 having an interior aperture that is tapped to mate with the threads in pre-load bolt 60.

Figure 4A:
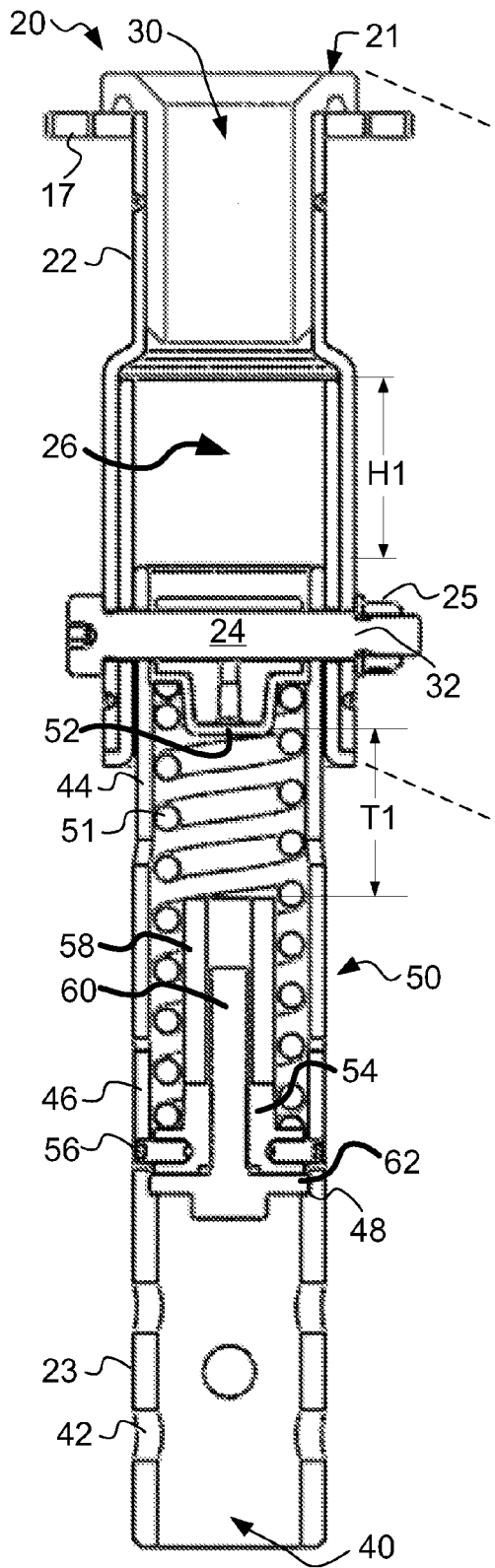
FIG. 4A is a cross-sectional side view of the modular suspension unit depicted in FIG. 3B.
Figure 4B:
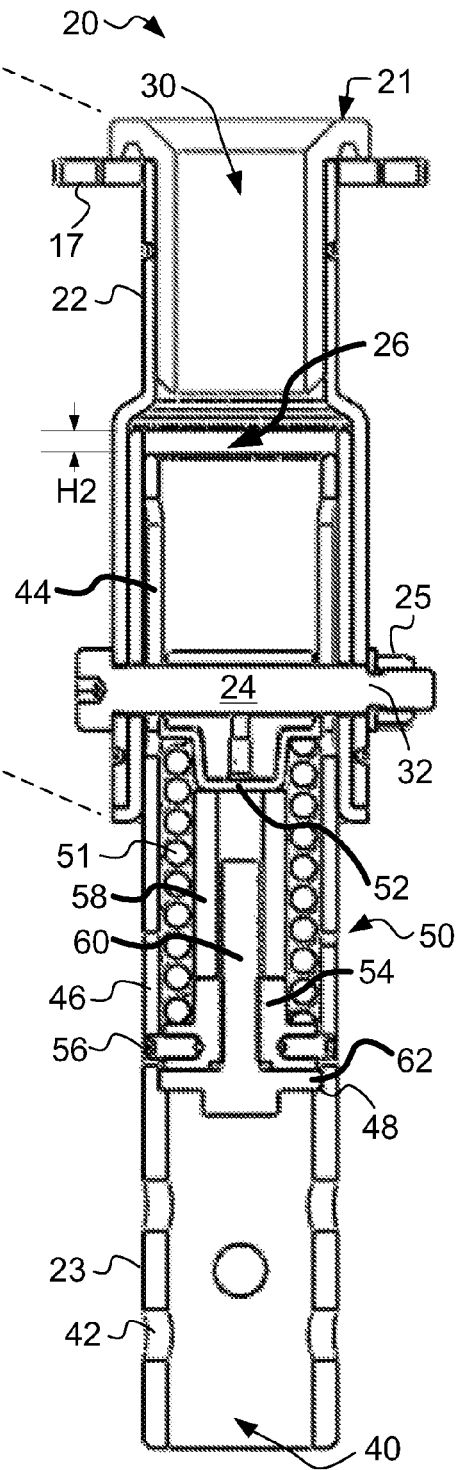
FIG. 4B is a cross-sectional side view of the modular suspension unit depicted in FIG. 4A, shown with the modular suspension unit in a compressed position.

Referring now to FIGS. 4A and 4B, when modular suspension unit 20 is in the uncompressed position shown in FIG. 4A, a gap 26 inside cavity 30 has an initial height H1, which is the maximum distance that inner post 23 can travel inside outer post 22 before inner post 23 contacts an inner ledge inside cavity 30, thereby preventing further movement of inner post 23 inside outer post 22. An upper stopper travel distance T1 inside cavity 40 is the distance that spring 51 can compress before upper stopper 52 contacts bumper 58, thereby preventing further movement of inner post 23 inside outer post 22.

When a user sits on seat assembly 14, a downward force is applied to outer post 22 at clover seat interface 17, which moves outer post 22 down over inner post 23. When wheels 12 encounter a force impact (e.g., riding over a gap between sidewalk cement tiles), an upward force is applied to inner post 23, which moves inner post 23 up into outer post 22. Either a downward force applied to outer post 22 or an upward force applied to inner post 23 will cause spring 51 to compress, thereby reducing the distance between upper stopper 52 and bumper 58 below upper stopper travel distance T1.

When modular suspension unit 20 begins to compress, thereby moving from the uncompressed position shown in FIG. 4A towards the compressed position shown in FIG. 4B, inner post 23 telescopes into outer post 22. As inner post 23 telescopes into outer post 22, coupling bolt 24 slides from the top of slots 44 toward the bottom of slots 44. The length and location of slots 44 in inner post 23 may be chosen such that slots 44 determines the distance that inner post 23 is permitted to telescope into outer post 22. For example, the top of slots 44 may determine the relative location inner post 23 and outer post 22 when modular suspension unit 20 is in an uncompressed position shown in FIG. 4A, and the bottom of slots 44 may determine the relative location of inner post 23 and outer post 22 when modular suspension unit 20 is in a fully compressed position (i.e., where both spring 51 and bumper 58 are compressed to a maximum desired position). Preferably, the length of slots 44 is at least as large as upper stopper travel distance T1 and at most as large as initial height H1 of gap 26.

When modular suspension unit 20 is in the compressed position shown in FIG. 4B, gap 26 inside cavity 30 has a compressed height H2, which is smaller than initial height H1 by an amount equal to travel distance T1. As shown in FIG. 4B, inner post 23 has traveled inside outer post 22 until upper stopper 52 has contacted bumper 58.

When modular suspension unit 20 is in the compressed position shown in FIG. 4B, spring 51 can still be compressed a little further by compressing bumper 58. Bumper 58 preferably is made from polyurethane, so that bumper 58 can be slightly compressed to allow spring 51 and bumper 58 to further compress and dissipate additional energy. For example, if modular suspension unit 20 is compressed by enough force such that upper stopper 52 contacts bumper 58, the contact between upper stopper 52 and bumper 58 may jolt the occupant in seat assembly 14. Having bumper 58 be capable of some compression to dissipate additional energy may allow for less force to be transmitted to an occupant in seat assembly 14 when modular suspension unit 20 "bottoms out," thereby potentially improving the smoothness of the ride to the occupant.

Figure 5A:
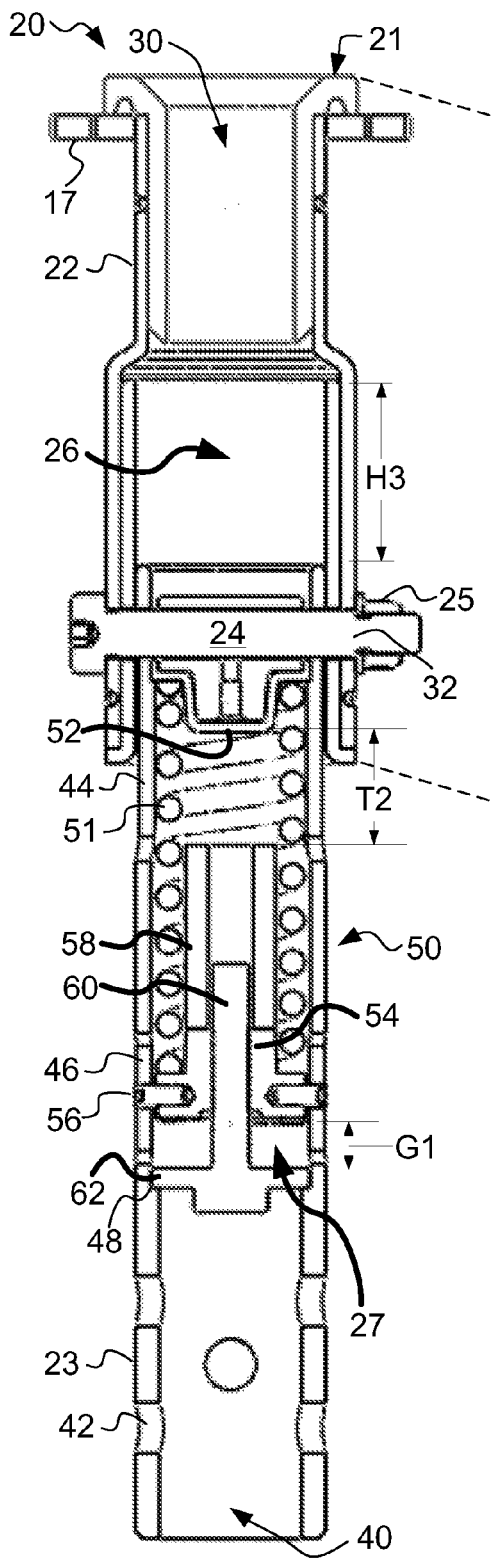
FIG. 5A is a cross-sectional side view of the modular suspension unit depicted in FIG. 4A, shown with the modular suspension unit in an uncompressed, pre-loaded position.
Figure 5B:
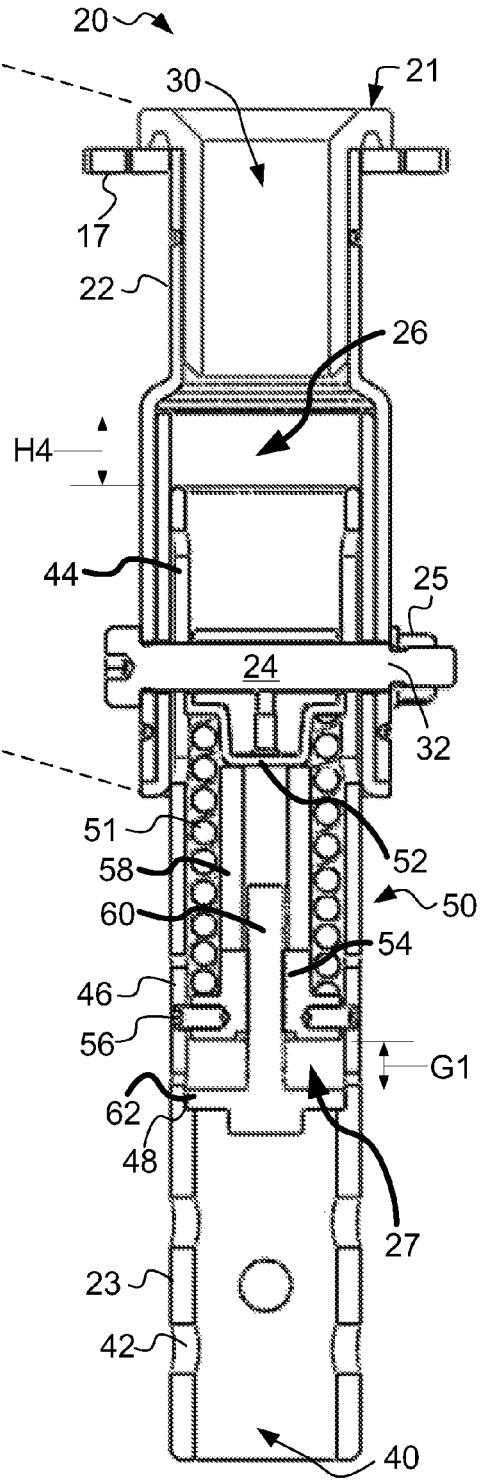
FIG. 5B is a cross-sectional side view of the modular suspension unit depicted in FIG. 5A, shown with the modular suspension unit in a compressed, pre-loaded position.

Referring now to FIGS. 5A and 5B, to place modular suspension unit 20 into a pre-loaded position while modular suspension unit 20 is in an uncompressed position, an occupant compresses (or reduces the height of) spring 51 by rotating pre-load bolt 60. Having spring 51 being pre-compressed to a greater degree than shown in FIGS. 4A and 4B will cause spring 51 to produce a greater resistance force (that is, a force in a direction opposite the direction of movement) for a given displacement, thereby improving the ride comfort for a heavier user. A lighter user may choose to place modular suspension unit 20 into a pre-loaded position if a stiffer suspension is desired.

Preferably, an occupant will select a desired amount of pre-load for modular suspension unit 20 based on the occupant's weight, the anticipated bumpiness of the ground to typically be traversed by scooter 10, and the desired smoothness of the ride to be felt by the occupant in seat assembly 14 of scooter 10. It is anticipated that an occupant may only have to adjust the pre-load of modular suspension unit 20 initially upon receipt of scooter 10 or when a new occupant having a different weight or comfort preference is preparing to ride scooter 10.

To place modular suspension unit 20 into a pre-loaded position by compressing spring 51, an occupant rotates pre-load bolt 60. For example, to rotate pre-load bolt 60, a user may insert a screwdriver into cavity 40 and into the center of head 62 of pre-load bolt 60. The center of head 62 may be adapted to receive the tip of a conventional screwdriver, such that rotating the screwdriver moves pre-load bolt 60 relative to lower stopper 54. Lower stopper 54 does not rotate because anti-rotation pins 56 that extend radially outward from lower stopper 54 are constrained by slots 46 in inner post 23, such that lower stopper 54 can move vertically but can not rotate.

When pre-load bolt 60 is rotated, preferably counterclockwise, lower stopper 54 is advanced upward toward upper stopper 52, thereby further compressing spring 51 and establishing a pre-load of spring 51. When lower stopper 54 is advanced upward, a pre-load gap 27 is created between head 62 of pre-load bolt 60 and lower stopper 54. Pre-load gap 27 defines a pre-load gap height G1.

Pre-load gap 27 is created because the downward vertical motion of pre-load bolt 60 is constrained by its head 62 fitting into shoulder 48 of inner post 23. While pre-load bolt 60 is rotated by a screwdriver, the expansive force of spring 51 against lower stopper 54 pushes downward on lower stopper 54, and that downward force is transferred to pre-load bolt 60 from the tapped interior aperture of lower stopper 54 to the threads of pre-load bolt 60, so head 62 of pre-load bolt 60 is forced against shoulder 48. When pre-load bolt 60 is rotated, because pre-load bolt 60 can not move down, lower stopper 54 is advanced upward, thereby creating pre-load gap 27.

The amount of permitted pre-load compression of spring 51 (that is, the maximum distance that spring 51 may be compressed upon pre-loading) is determined or limited by the length of slots 46. As pre-load gap 27 increases due to rotating of pre-load bolt 60, pre-load gap height G1 will increase until it reaches a maximum height that is equal to the length of slots 46, and anti-rotation pins 56 contact the top of slots 46.

To reduce the amount of pre-load of modular suspension unit 20 while modular suspension unit 20 is in an uncompressed position, an occupant rotates pre-load bolt 60 in the opposite direction from when the pre-load was established, preferably clockwise, which will cause lower stopper 54 to retreat downward toward head 62 of pre-load bolt 60, thereby reducing pre-load gap height G1 of pre-load gap 27 and increasing the height of spring 51.

When modular suspension unit 20 is in the uncompressed, pre-loaded position shown in FIG. 5A, gap 26 inside cavity 30 has a pre-load initial height H3 that is smaller than initial height H1 shown in FIG. 4A by pre-load distance G1, which is the height of pre-load gap 27 that has been opened between lower stopper 54 and head 62 of pre-load bolt 60. A pre-load upper stopper travel distance T2 inside cavity 40 is smaller than upper stopper travel distance T1 shown in FIG. 4A by pre-load distance G1.

When modular suspension unit 20 begins to compress, thereby moving from the uncompressed, pre-loaded position shown in FIG. 5A towards the compressed, pre-loaded position shown in FIG. 5B, inner post 23 telescopes into outer post 22, although to a lesser permitted degree than the compressed position shown in FIG. 4B, due to the smaller pre-load initial height H3 and the smaller pre-load upper stopper travel distance T2.

When modular suspension unit 20 is in the compressed, pre-loaded position shown in FIG. 5B, gap 26 inside cavity 30 has a pre-load compressed height H4, which is smaller than pre-load initial height H3 by an amount equal to travel distance T2. Also, pre-load compressed height H4 of gap 26 is greater than compressed height H2 by an amount equal to pre-load distance G1. Although the pre-loading of spring 51 results in a smaller travel distance T2 of upper stopper 52 toward bumper 58, the height of spring 51 in the compressed, pre-loaded position shown in FIG. 5B is the same as in the compressed position shown in FIG. 4B.

When modular suspension unit 20 is in the compressed, pre-loaded position shown in FIG. 5B, spring 51 can still be compressed a little further by compressing bumper 58, thereby dissipating additional energy. Having bumper 58 be capable of some compression to dissipate additional energy may allow for less force to be transmitted to an occupant in seat assembly 14 when modular suspension unit 20 "bottoms out," thereby potentially improving the smoothness of the ride to the occupant.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Further, several advantages have been described that flow from the structure and methods; the present invention is not limited to structure and methods that encompass any or all of these advantages. Those skilled in wheelchair or scooter technology, having the benefit of the teachings of this specification, may effect numerous modifications to the invention as described herein, and changes can be made without departing from the scope and spirit of the invention as defined by the appended claims. Furthermore, any features of one described embodiment can be applicable to the other embodiments described herein. For example, any features or advantages related to the design of the modular suspension unit with respect to discussion of a particular personal mobility vehicle embodiment can be applicable to any of the other personal mobility vehicle embodiments described herein.

What is claimed:

1. A powered personal mobility vehicle for transporting an infirm occupant comprising:
   at least three wheels configured to contact the ground while the vehicle is operating;
   at least one electric motor for powering at least one of the wheels in response to input from an occupant;
   a frame to which the wheels and motor are coupled;
   a lower seat post that extends up from the frame;
   a modular suspension unit supported by the lower seat post, the modular suspension unit comprising:
      a post assembly that includes an outer post slidably coupled to an inner post; and
      a dampener coupled to the post assembly;
      the modular suspension unit is removeably coupled to the lower seat post and is configured to be removable from the lower seat post as a unitary assembly; and
   a seat assembly configured to hold an infirm occupant and coupled to the modular suspension unit such that substantially all of the vertical load of the seat assembly is supported by the modular suspension unit,
   wherein the outer post, the inner post, and the dampener are configured to dampen vertical movement of the seat assembly relative to the frame in response to impact between the wheels and the ground.

2. The powered personal mobility vehicle of claim 1, wherein the modular suspension unit further includes a pre-loading mechanism adapted to reduce the height of the dampener while the modular suspension unit is in an uncompressed position.

3. The powered personal mobility vehicle of claim 1, wherein the pre-loading mechanism comprises a threaded bolt and a tapped lower stopper.

4. The powered personal mobility vehicle of claim 1, wherein the lower seat post is welded to the frame.

5. The powered personal mobility vehicle of claim 1, further comprising a retainer for preventing removal of the modular suspension unit from the lower seat post until actuation of the retainer, the retainer consisting essentially of a pin that extends through apertures in the lower seat post and the modular suspension unit.

6. The powered personal mobility vehicle of claim 1, wherein the lower seat post is a tubular lower seat post that extends up from the frame.

7. The powered personal mobility vehicle of claim 6, wherein the lower seat post comprises a vertically oriented tube and the outer post and the inner post of the modular suspension unit comprise vertically oriented tubes.

8. The powered personal mobility vehicle of claim 6, wherein the modular suspension unit is capable of longitudinally slideable engagement with the lower seat post.

9. The powered personal mobility vehicle of claim 1, further comprising solid core tires coupled to each of the wheels.

10. The powered personal mobility vehicle of claim 1, wherein the modular suspension unit further comprises a clover seat interface that couples the post assembly to the seat assembly.

11. The powered personal mobility vehicle of claim 1, wherein the dampener is located completely within the post assembly.

12. A modular suspension unit for a pre-existing scooter or wheelchair frame, the modular suspension unit comprising:
   a post assembly that includes an outer post slidably coupled to an inner post, the inner post is configured to engage a pre-existing upward extending portion of the frame of the scooter or wheelchair; and
   a dampener coupled to the post assembly;
   the post assembly is configured to be removeably coupled to the pre-existing upward extending portion of the frame and is configured to be removable from the pre-existing upward extending portion of the frame as a unitary assembly with the dampener; and
   the outer post, the inner post, and the dampener are configured to dampen vertical movement of the seat assembly relative to the pre-existing upward extending portion of the frame in response to impact forces acting on the pre-existing upward extending portion of the frame.

13. The modular suspension unit of claim 12, further comprising a pre-loading mechanism adapted to reduce the height of the dampener while the modular suspension unit is in an uncompressed position.

14. The modular suspension unit of claim 12, wherein the dampener is located completely within the post assembly.

15. The modular suspension unit of claim 13, wherein the pre-loading mechanism comprises a threaded bolt and a tapped lower stopper.

16. The modular suspension unit of claim 12, further comprising a retainer configured to prevent removal of the post assembly from the pre-existing portion of the frame until actuation of the retainer, the retainer consisting essentially of a pin that extends through apertures in the lower seat post and the post assembly.

17. The modular suspension unit of claim 12, wherein the outer post and the inner post of the post assembly comprise vertically oriented tubes.

18. The modular suspension unit of claim 12, wherein the pre-existing portion of the frame is a tubular lower seat post.

19. The modular suspension unit of claim 12, wherein the modular suspension unit is capable of longitudinally slideable engagement with the lower seat post.

20. A method of retrofitting a pre-existing scooter or wheelchair frame with a suspension comprising the steps of:
   detaching a seat assembly capable of holding an infirm occupant from a lower seat post of the frame;
   removing an existing upper seat post from the seat assembly; and
   replacing the existing upper seat post with a retrofit modular suspension unit, wherein the retrofit modular suspension unit is a unitary assembly comprising:
      a post assembly that includes an outer post slidably coupled to an inner post; and
      a dampener coupled to the post assembly.

21. The method of claim 20, further comprising the step of adjusting pre-loading of the retrofit modular suspension unit according to the weight or desired dampening of the occupant.

22. The method of claim 21, wherein the step of adjusting pre-loading of the retrofit modular suspension unit comprises rotating a pre-load bolt to compress the dampener.

23. The method of claim 20, further comprising the step of longitudinally sliding the retrofit modular suspension unit into engagement with the lower seat post.

24. The method of claim 20, further comprising the step of inserting a retainer to prevent removal of the retrofit modular suspension unit from the lower seat post until actuation of the retainer, the retainer consisting essentially of a pin that extends through apertures in the lower seat post and the retrofit modular suspension unit.

25. The method of claim 20, wherein the dampener is located completely within the post assembly.

26. The powered personal mobility vehicle of claim 1, wherein the seat assembly is coupled to the outer post of the post assembly.

27. The modular suspension unit of claim 12, wherein the outer post is configured to couple to a seat assembly capable of holding an infirm occupant.

28. The method of claim 21, wherein the step of replacing the existing upper seat post with a retrofit modular suspension unit comprises coupling the seat assembly to the outer post.

* * * * *